(12) United States Patent
Kunze

(10) Patent No.: US 11,407,433 B2
(45) Date of Patent: Aug. 9, 2022

(54) ARTICULATED VEHICLE HAVING A PASSAGE WITH A NOISE INSULATING LAYER

(71) Applicant: Hübner GmbH & Co. KG, Kassel (DE)

(72) Inventor: Andreas Kunze, Melsungen (DE)

(73) Assignee: Hübner GmbH & Co. KG, Kassel (DE)

( * ) Notice: Subject to any disclaimer, the term of this patent is extended or adjusted under 35 U.S.C. 154(b) by 744 days.

(21) Appl. No.: 16/322,739

(22) PCT Filed: Jul. 28, 2017

(86) PCT No.: PCT/DE2017/100633
§ 371 (c)(1),
(2) Date: Feb. 1, 2019

(87) PCT Pub. No.: WO2018/024289
PCT Pub. Date: Feb. 8, 2018

(65) Prior Publication Data
US 2019/0202482 A1     Jul. 4, 2019

(30) Foreign Application Priority Data
Aug. 3, 2016    (DE) .......................... 102016114355.3

(51) Int. Cl.
*B61D 17/22*     (2006.01)
*B61D 17/18*     (2006.01)
*B60D 5/00*     (2006.01)

(52) U.S. Cl.
CPC ............. *B61D 17/22* (2013.01); *B60D 5/006* (2013.01); *B61D 17/18* (2013.01); *B61D 17/185* (2013.01)

(58) Field of Classification Search
CPC ...... B61D 17/00; B61D 17/18; B61D 17/185; B61D 17/20; B61D 17/22; B60D 5/00; B60D 5/003; B60D 5/006; B62D 47/025
See application file for complete search history.

(56) References Cited

U.S. PATENT DOCUMENTS 2,085,713 A * 6/1937 Dwyer, Jr. ............. B61D 17/20
                                                                                    213/222
3,410,226 A * 11/1968 Krupp .................... B61D 17/22
                                                                                    105/10

(Continued)

FOREIGN PATENT DOCUMENTS

| EP | 2082942 A1 * | 7/2009 | ............. B61D 17/22 |
|---|---|---|---|
| EP | 2082942 A1 | 7/2009 | |
| FR | 2333657 A1 | 7/1977 | |

*Primary Examiner* — Zachary L Kuhfuss
*Assistant Examiner* — Cheng Lin
(74) *Attorney, Agent, or Firm* — Dinsmore & Shohl LLP

(57) ABSTRACT

The invention relates to an articulated vehicle including a plurality of vehicles or vehicle parts connected to one another in an articulated manner, a passage arranged between adjacent ones of the vehicles or the vehicle parts, the passage having an inner lining and an outer lining laterally spaced from the inner lining so as to define an empty cavity therebetween, one front wall on each side of the passage between the two adjacent vehicles or vehicle parts, the inner lining and the outer lining being arranged at the front walls of the two adjacent vehicles or vehicle parts while forming the empty cavity therebetween, a noise-absorbing noise insulation layer applied to a free surface on each of the front walls in the empty cavity between the inner and outer lining, wherein each of the noise-absorbing noise insulation layer extends into the empty cavity and terminates at a surface facing opposite to the each of the front walls respectively.

13 Claims, 3 Drawing Sheets

(56) References Cited

U.S. PATENT DOCUMENTS

| | | | | |
|---|---|---|---|---|
| 4,411,201 A | * | 10/1983 | Hassel | B61D 17/22 |
| | | | | 105/1.1 |
| 4,599,947 A | * | 7/1986 | Keefer | B61D 17/22 |
| | | | | 105/15 |
| 4,736,688 A | * | 4/1988 | Ando | B61D 17/22 |
| | | | | 105/17 |
| 5,060,578 A | * | 10/1991 | Carimentrand | B61D 3/181 |
| | | | | 105/18 |
| 6,196,132 B1 | * | 3/2001 | Hubner | B60D 5/003 |
| | | | | 105/15 |
| 7,971,924 B2 | * | 7/2011 | Tabellini | B60D 5/003 |
| | | | | 296/178 |
| 8,869,706 B2 | * | 10/2014 | Koukal | B61D 17/22 |
| | | | | 105/18 |
| 10,518,594 B2 | * | 12/2019 | Junke | B62D 47/025 |
| 2017/0247119 A1 | * | 8/2017 | Busch | B60D 5/003 |

\* cited by examiner

ARTICULATED VEHICLE HAVING A PASSAGE WITH A NOISE INSULATING LAYER

REFERENCE TO RELATED APPLICATIONS

This application is the U.S. National Stage of PCT/DE2017/100633, filed Jul. 28, 2017, which claims priority of German Patent Application No. DE102016114355.3, filed Aug. 3, 2016; the entire content of each application being incorporated herein by reference.

FIELD OF INVENTION

The invention relates to an articulated vehicle, for example a rail vehicle or an articulated bus, formed from a plurality of vehicles or vehicle parts connected to one another in an articulated manner, wherein a passage is arranged between the vehicles or the vehicle parts, wherein the passage has an inner lining and an outer lining at a lateral spacing therefrom, and wherein the inner lining and the outer lining are arranged at the front walls of two adjacent vehicles or vehicle parts while forming the spacing from one another.

BACKGROUND OF THE INVENTION

A passage is provided both with rail vehicles and with road vehicles, for example an articulated bus, between two vehicle parts or vehicles that are connected to one another in an articulated manner. Such a passage in detail comprises a bellows that spans in a tunnel-like manner a passage device, for example a platform or a bridge.

Passages are known in this connection in which not only a bellows is provided that extends between the front walls of the coach bodies of the two vehicles or vehicle parts connected to one another in an articulated manner, but there are rather also embodiments in which two bellows are provided that are arranged radially or laterally spaced apart from one another as is known by way of example from EP 2 335 995 B1. As already stated, the bellows are arranged laterally or radially spaced apart from one another at the front walls of the coach bodies of the vehicle parts disposed opposite one another, that is, there is a free space on the front wall between the inner bellows and the outer bellows. Such passages having two bellows stored within one another are inter alia used for purposes of sound insulation, in particular in rail traffic with fast traveling trains, for example the Intercity Express (ICE).

The demands on soundproofing have, however, been increased more and more over time. It has thus in particular also been attempted to implement increased noise insulation values by insulating the floor region of the passage. However, the achieved noise insulation values still did not satisfy the demands made.

The bellows materials have in particular been further developed with the aim of increased noise insulation in that the bellows material was provided with an insulating material. However, this resulted in thicker, heavier, and also more expensive bellows. Sound-insulated bellows are furthermore known from DE 198 21 083 B1 in which mutually overlapping flaps are attached to the inner sides of the wave-like bellows elements of a wave bellows.

It is also known to install noise insulating material in the intermediate space of a passage region between the inner cover and outer cover such as is described in DE 10 57 639 A. Such a measure is in particular suitable to restrict the movability of the passage protection on pitching, buckling, rolling or offset movements; that is, the passage protection then possibly no longer satisfies the dynamic demands.

SUMMARY OF THE INVENTION

The underlying object of the invention to this extent comprises achieving a reduction of the noise value measured in the passage in an articulated vehicle of the initially named kind by simple and inexpensive means.

It is proposed in accordance with the invention to achieve this object that a noise absorbing sound insulation layer can be applied to the free surface formed by the spacing on the front wall. The free surface is here formed by the lateral spacing between the inner lining and the outer lining on the front wall of the respective coach body of the vehicles connected to one another in an articulated manner. It is in particular advantageous if additional sound insulating and/or sound absorbing materials can be dispensed with in the space between the inner lining and the outer lining of the passage between the connected vehicles or vehicle parts or if no such materials are arranged there; that is, no restrictions with respect to the movability of, for example, a double wave bellows are to be feared in the implementation of the invention. Supply tubes or lines that are guided between the outer lining and the inner lining between the vehicles connected to one another in an articulated manner are not noise insulation means in this connection.

This means that the sound pressure in the space between the outer lining and the inner lining, in particular between the outer bellows and the inner bellows, is reduced by noise absorption by application of a noise insulating layer to the front wall without any noise insulating measures having to be taken at the lining, and here in particular at the bellows, to reduce the transmission of the noise into the interior of the passage that would impair the movability of the bellows.

The noise insulating layer can here be formed as noise absorbing, in particular as a mat, foam, or similar, with the use of insulating material having a small specific weight of its own in particular having proved advantageous since a significant reduction of the noise pressure in the space between the outer lining and the inner lining of the passage can be achieved by such a noise absorbing insulation material. This means that a smaller noise pressure is then also applied to the inner lining, which has the direct effect that the noise pressure in the interior of the passage is also considerably reduced.

A substantial reduction of the noise pressure in the interior of the passage is thus already achieved when an insulation of approximately 5 cm in thickness is applied to a free surface between the inner lining and the outer lining of approximately 8 to 10 cm in width. The free surface here extends in accordance with the contour of the outer lining and inner lining in a U shape at the front wall of the respective coach body of the two vehicles or vehicle parts connected to one another in an articulated manner. The complete free surface is advantageously provided with an insulating layer. It can, however, also be sufficient to cover partial areas of the free surface with a noise insulation layer.

The connection of the noise insulation layer, that is in particular of mat-like form, to the front wall takes place by adhesive bonding, by screwing, or by riveting.

The outer lining and/or inner lining is/are in this respect advantageously configured as a bellows, for example as a wave bellows. The invention can, however, generally be used with every kind of inner lining and outer lining, that is, for example, with an inner lining or outer lining that is formed from an elastic, coated fabric or with an inner lining in the manner of at least one flexible and/or rollable side wall, or also with a corresponding top lining.

The outer lining and the inner lining are connected to the front wall of the respective vehicle or vehicle part by fastening means, advantageously by a respective screw-on frame. The option results in this connection, when the noise insulation layer is applied to a carrier plate, for example composed of metal, to fasten said noise insulation layer, for example by screwing, to the corresponding side wall together with at least one screw-on frame, preferably with both screw-on frames. This means that the screw connection of the screw-on frames takes place together with the carrier plate. It is, however, also conceivable to fasten, for example to screw, the carrier plate to the at least one screw-on frame. In each case, additional binding means by which the carrier plate is fixed to the front wall are omitted; the front wall is in particular to this extent not weakened by additional bores for the reception of screws. This previously described embodiment furthermore opens up the possibility of selling such noise insulation means as parts of a complete package with the passage or with the bellows.

With a rollable side wall as the inner lining, at least one fastening console is provided as the fastening means that can likewise be screwed to the front wall with the carrier plate. It is also conceivable here to connect the carrier plate to the fastening console and/or to the screw-on frame as a fastening means for the outer lining.

BRIEF DESCRIPTION OF THE DRAWINGS

The invention will be described in more detail below by way of example with reference to the drawings.

DETAILED DESCRIPTION OF THE INVENTION

Figure 1:
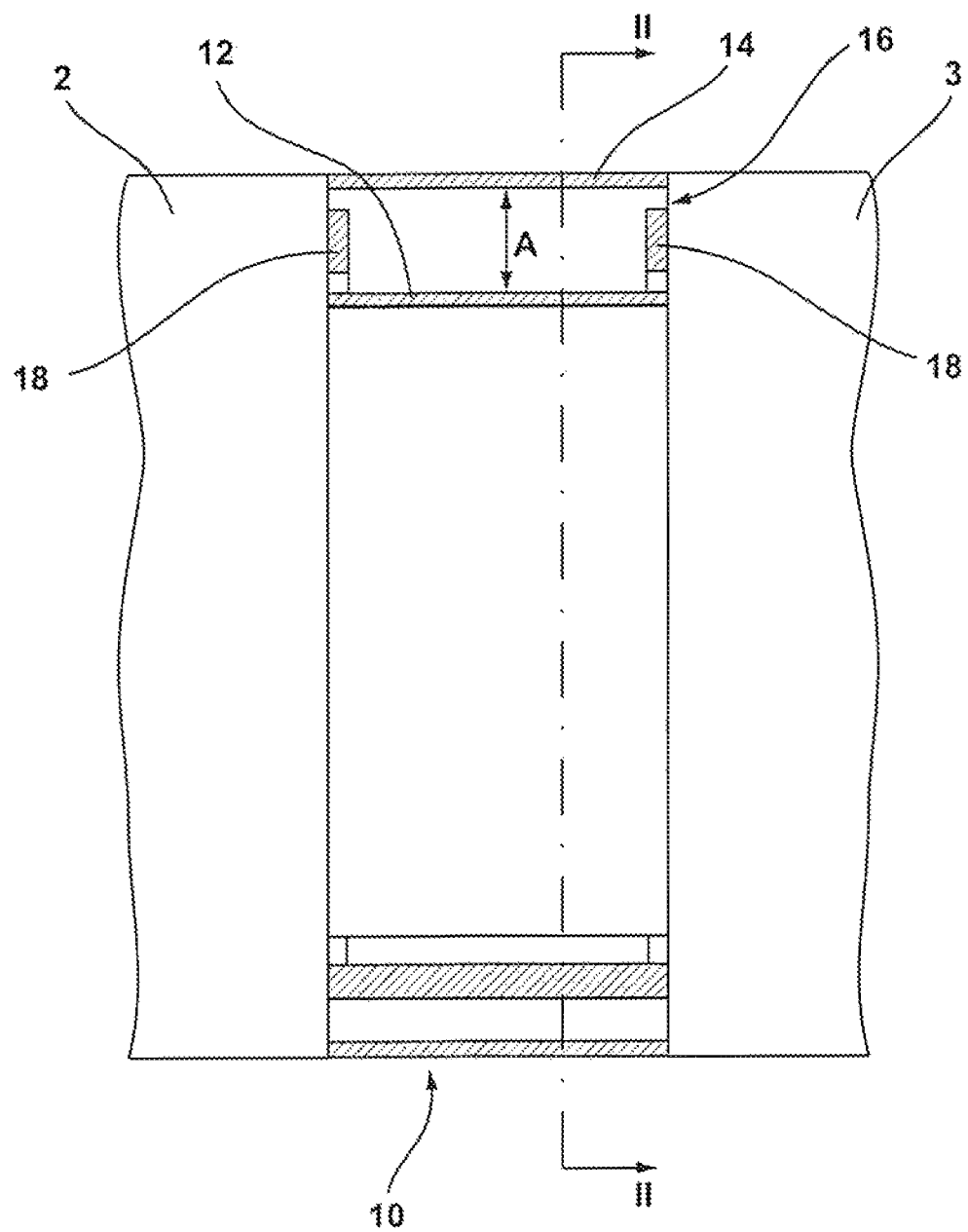
FIG. 1 schematically shows the arrangement of a passage between two vehicles or vehicle parts in a side view in section.
Figure 2:
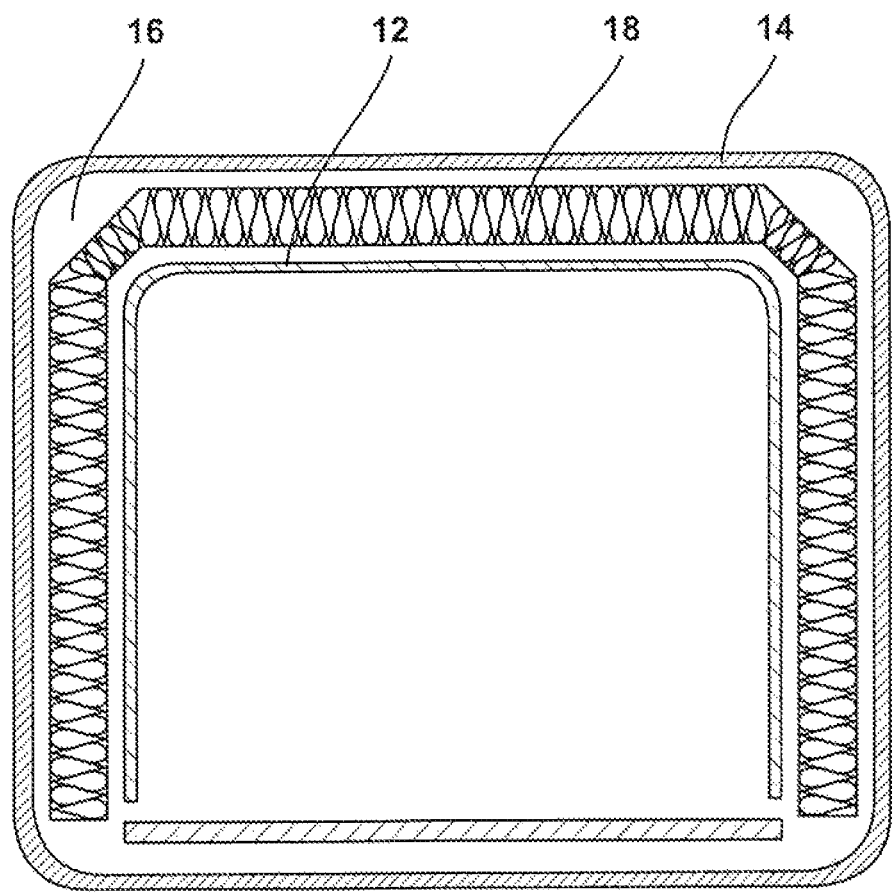
FIG. 2 shows a view in accordance with the line II/II of FIG. 1.

The passage marked in its entirety by 10 is located between the two coach bodies 2, 3 of the vehicles or vehicle parts connected to one another in an articulated manner. The passage 10 comprises an outer lining 14 and an inner lining 12 that extend between the front walls of the coach bodies 2 and 3 while forming a spacing A and that are fastened to the front walls. The outer lining and inner lining 14, 12 can each be formed as a bellows, for example as a wave bellows. A free surface 16 is provided on the respective front wall of the coach bodies of the vehicles or vehicle parts connected to one another in an articulated manner by the spacing A between the inner lining 12 and the outer lining 14, with the noise insulation layer 18 being arranged on the free surface 16. The noise insulation layer 18 extends, as in particular results on a view of FIG. 2, in substantially U shape peripherally between the inner lining 12 and the outer lining 14. The noise insulation layer 18, that in particular has a thickness of approximately 5 cm, can be adhesively bonded, screwed, or also riveted to the front wall of the coach bodies 2, 3.

Figure 3:
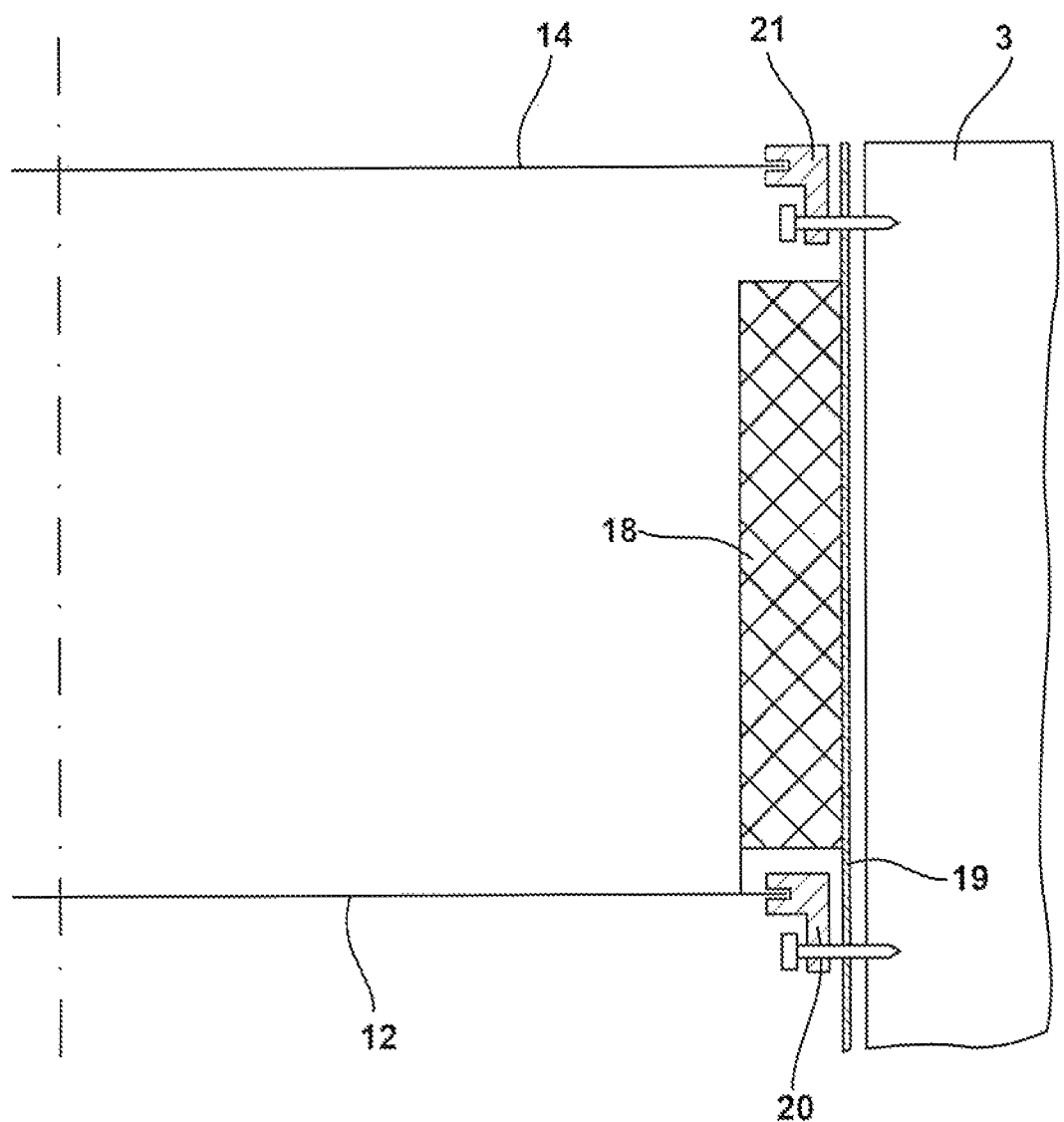
FIG. 3 shows a variant of FIG. 1 of the arrangement of the noise insulation layer on the end face of the vehicle parts.

In the representation in accordance with FIG. 3, the insulation layer 18 is arranged on a carrier plate 19, for example by adhesive bonding or by screwing. The carrier plate 19 is in each case captured by the screw-on frame 20, 21 of the inner lining and outer lining 12, 14 to connect the screw-on frames 20, 21 together with the carrier plate 19 to the front wall of the respective vehicle or vehicle part. The carrier plate 19 thus extends over the free surface 16 up to and into the region of the screw-on frames 20, 21. It is likewise conceivable to connect the carrier plate 19 with the insulation layer 18 directly to the screw-on frames 20, 21.

REFERENCE NUMERAL LIST 2 coach body
3 coach body
10 passage
12 inner lining
14 outer lining
A spacing
16 free surface
18 noise insulation layer
19 carrier plate
20 screw-on frame
21 screw-on frame

The invention claimed is:

1. An articulated vehicle, comprising:
a plurality of vehicles or vehicle parts connected to one another in an articulated manner;
a passage arranged between adjacent ones of the vehicles or the vehicle parts, the passage having an inner lining and an outer lining laterally spaced from the inner lining so as to define an empty cavity therebetween;
one front wall on each side of the passage between the two adjacent vehicles or vehicle parts, the inner lining and the outer lining being arranged at the front walls of the two adjacent vehicles or vehicle parts while forming the empty cavity therebetween; and
a noise-absorbing noise insulation layer applied to a free surface on each of the front walls in the empty cavity between the inner and outer lining,
wherein each of the noise-absorbing noise insulation layer extends into the empty cavity and terminates at a free surface facing opposite to the each of the front walls respectively.

2. The articulated vehicle in accordance with claim 1, wherein the noise-absorbing insulation layer is formed as a mat and/or a foam.

3. The articulated vehicle in accordance with claim 1, wherein the noise insulation layer is formed in mat-like form.

4. The articulated vehicle in accordance with claim 1, wherein the noise insulation layer is adhesively bonded, or screwed, or riveted to the front wall of a respective coach body of the vehicles or vehicle parts.

5. The articulated vehicle in accordance with claim 1, wherein the inner lining and/or outer lining is/are formed as bellows.

6. The articulated vehicle in accordance with claim 1, wherein the inner lining has at least one flexible and/or rollable side wall.

7. The articulated vehicle in accordance with claim 1, wherein no additional noise insulating and/or noise absorbing materials are arranged between the connected vehicles or vehicle parts in the space between the inner lining and the outer lining of the passage.

8. The articulated vehicle in accordance with claim 1, wherein the outer lining and inner lining are arranged at the front walls of the two adjacent vehicles or vehicle parts by a fastener.

9. The articulated vehicle in accordance with claim 8, wherein each of the noise insulation layers is arranged on a carrier plate that is fastened together with at least one fastener to the front wall of the respective vehicle or vehicle part.

10. The articulated vehicle in accordance with claim 9, wherein the fastener is a screw-on frame and/or a fastening console.

11. The articulated vehicle in accordance with claim 8, wherein the fastener is a screw-on frame and/or fastening console.

12. The articulated vehicle in accordance with claim 1, wherein each of the surface of the respective noise-absorbing noise insulation layer are separated from each other.

13. The articulated vehicle in accordance with claim 1, wherein the each of the noise-absorbing insulation layer is applied to a plate attached on each of the front walls of the two adjacent vehicles or vehicle parts.

* * * * *